US011319017B2

(12) United States Patent
Snead

(10) Patent No.: US 11,319,017 B2
(45) Date of Patent: May 3, 2022

(54) HYDRAULIC BRAKE CONTROL DEVICE WITH STAGGERED TIMING PORTS

(71) Applicant: SRAM, LLC, Chicago, IL (US)

(72) Inventor: Braden T. Snead, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 14/886,270

(22) Filed: Oct. 19, 2015

(65) Prior Publication Data

US 2017/0106939 A1 Apr. 20, 2017

(51) Int. Cl.
| B62L 3/02 | (2006.01) |
| B62L 1/00 | (2006.01) |
| B60T 11/16 | (2006.01) |
| B60T 11/232 | (2006.01) |
| B62K 23/06 | (2006.01) |

(52) U.S. Cl.
CPC ............... B62L 3/023 (2013.01); B60T 11/16 (2013.01); B60T 11/232 (2013.01); B62K 23/06 (2013.01); B62L 1/00 (2013.01); B62L 1/005 (2013.01)

(58) Field of Classification Search
CPC .. B62L 1/00; B62L 3/023; B62L 1/005; F16D 2125/04; F16D 2125/06; F16D 2125/08; F16D 2125/64; B60T 11/22; B60T 11/16; B60T 11/232
See application file for complete search history.

(56) References Cited

U.S. PATENT DOCUMENTS

| 4,456,310 | A | * | 6/1984 | Hayashi | B60T 8/3225 |
| | | | | | 188/181 R |
| 4,560,049 | A | * | 12/1985 | Uchibaba | B62K 23/02 |
| | | | | | 188/196 M |
| 4,788,821 | A | * | 12/1988 | Mienko | F15B 7/005 |
| | | | | | 60/534 |
| 6,658,844 | B1 | * | 12/2003 | Lammers | B60T 11/22 |
| | | | | | 116/227 |
| 7,114,335 | B2 | * | 10/2006 | Becocci | B62K 23/06 |
| | | | | | 60/588 |
| 7,178,646 | B2 | | 2/2007 | Lumpkin | |
| 7,204,088 | B2 | * | 4/2007 | Uchiyama | B62L 3/023 |
| | | | | | 60/594 |
| 7,222,703 | B2 | * | 5/2007 | Laghi | B60T 11/22 |
| | | | | | 188/151 R |
| 8,893,859 | B2 | | 11/2014 | Wang | |
| 2003/0121262 | A1 | * | 7/2003 | Lumpkin | B60T 11/22 |
| | | | | | 60/594 |
| 2005/0056508 | A1 | * | 3/2005 | Laghi | B60T 11/22 |
| | | | | | 188/344 |
| 2008/0155982 | A1 | * | 7/2008 | Jones | B60T 11/22 |
| | | | | | 60/588 |
| 2008/0294095 | A1 | * | 11/2008 | Zacharias | A61M 1/0035 |
| | | | | | 604/65 |

* cited by examiner

Primary Examiner — Melody M Burch

(57) ABSTRACT

A hydraulic braking system for a bicycle may include a hydraulic control device that is configured with multiple timing ports positioned within a stroke of a piston of the hydraulic control device. The multiple timing ports are located at different positions along an operational and/or axial length of a cylinder of the hydraulic control device.

20 Claims, 12 Drawing Sheets

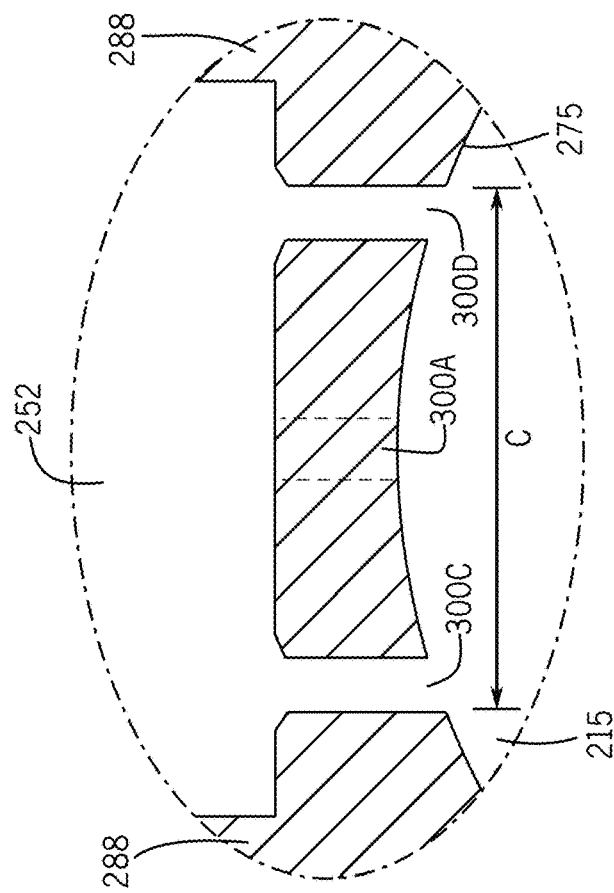
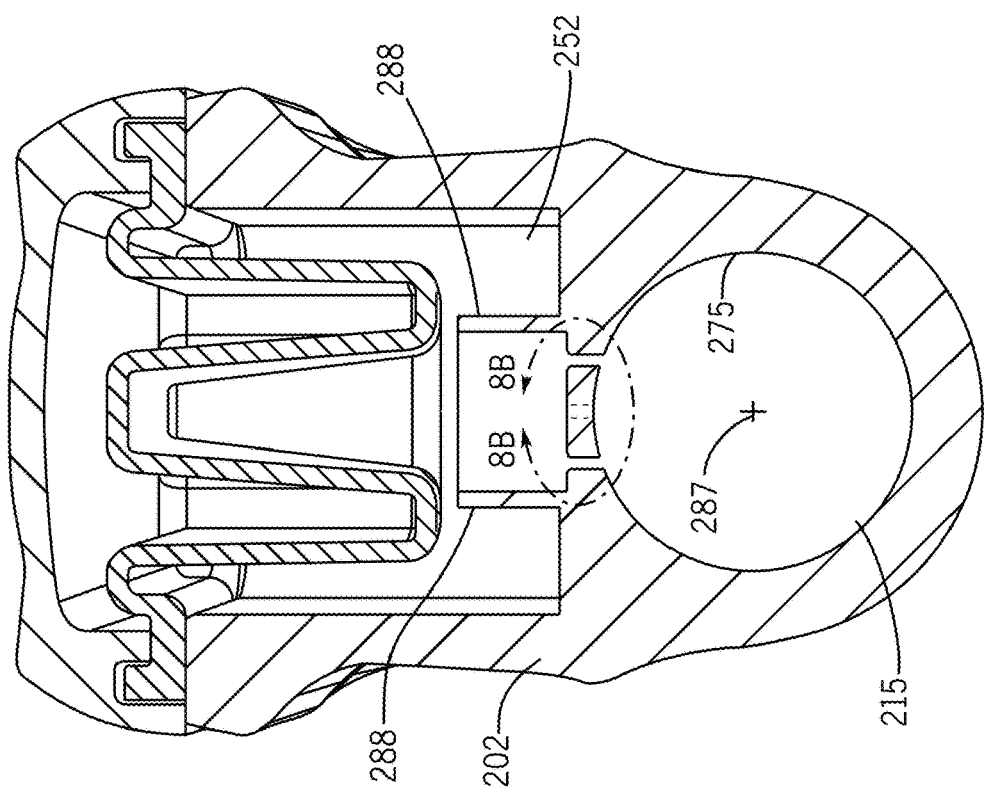

HYDRAULIC BRAKE CONTROL DEVICE WITH STAGGERED TIMING PORTS

BACKGROUND OF THE INVENTION

A traditional bicycle may include a hydraulic brake system employing a master cylinder to provide and/or control the braking forces exerted by the system. Typically, a piston in the master cylinder is actuated through a lever or other device such that the piston moves along a cylinder axis and generates pressure in the cylinder that is communicated to a braking device that can translate the generated pressure into a braking force for the bicycle. Many brake systems also employ a reservoir to provide hydraulic fluid to the hydraulic system. To provide the hydraulic fluid, the reservoir may be in fluid communication with the master cylinder. This fluid communication should be discontinued during a stroke of the piston to allow for pressure buildup in the cylinder to actuate the braking device. To accomplish this a port (i.e. timing port) connecting the reservoir and the master cylinder have been strategically positioned to both provide this fluid communication, and define a position along the master cylinder for discontinuation of this fluid communication as the piston moves past and/or sealingly engages the port.

The cross-sectional area of a timing port is sized to facilitate a flow of a volume of fluid contained in the master cylinder between a starting point of the piston stroke and a sealing engagement of the timing port. A large port providing the total required cross-sectional area to facilitate the fluid flow may create an opening large enough within the master cylinder to cause excessive seal wear. Further, the placement of holes beyond a particular sector of the master cylinder may also cause excessive seal wear. This geometric limiting may be due to an increasing size of a bore opening in the master cylinder as the bore intersects the master cylinder at increasing distances from a central axis of the master cylinder. These increased opening sizes may cause the excessive seal wear.

SUMMARY

In an embodiment, a hydraulic control device for a bicycle hydraulic brake includes a reservoir for hydraulic fluid and a cylinder having an interior defined by a cylinder wall, the cylinder extended along a cylinder axis. The hydraulic control device also includes a piston positioned in the cylinder interior having a seal operatively associated therewith, the piston and seal being moveable along the cylinder axis between the first and second cylinder ends, wherein the seal defines a fluid pressure chamber and has a starting position and ending position within the cylinder defining a stroke of the piston. The hydraulic control device also includes a plurality of ports providing fluid communication between the cylinder interior and the reservoir, the plurality of ports disposed within the stroke of the piston at different positions along the cylinder axis, wherein the seal sealingly engages the plurality of ports within the stroke.

In an embodiment, a hydraulic braking system for a bicycle includes a hydraulic control device configured for mounting to a bicycle handlebar. The hydraulic control device includes a reservoir for hydraulic fluid, and a cylinder having an interior defined by a cylinder wall, the cylinder extended along a cylinder axis. The hydraulic control device also includes a piston positioned in the cylinder interior having a seal operatively associated therewith, the piston and seal being moveable along the cylinder axis between the first and second cylinder ends, the seal having a starting position and ending position within the cylinder defining a stroke of the piston, and a plurality of ports providing fluid communication between the cylinder interior and the reservoir, the plurality of ports disposed within the stroke of the piston at different distances from the first cylinder end along the cylinder axis. The hydraulic braking system also includes a brake force application device in fluid communication with the hydraulic control device and configured to provide a stopping force to a wheel of the bicycle in response to movement of the piston along the stroke.

BRIEF DESCRIPTION OF THE DRAWINGS

FIGS. 8A-8B are cross-sectional views of the hydraulic braking control device of FIGS. 2 and 3;

Other aspects and advantages of the embodiments disclosed herein will become apparent upon consideration of the following detailed description, wherein similar or identical structures have similar or identical reference numerals.

DETAILED DESCRIPTION

A hydraulic braking system may include a hydraulic control device configured with multiple timing ports. The timing ports are located at different positions along an operational and/or axial length of a cylinder of the hydraulic control device. Arranging the multiple timing ports in such a manner allows for the ports to have smaller diameters than what would be available when using a single port, while limiting the interface of the ports to a particular sector of the cylinder.

Figure 1:
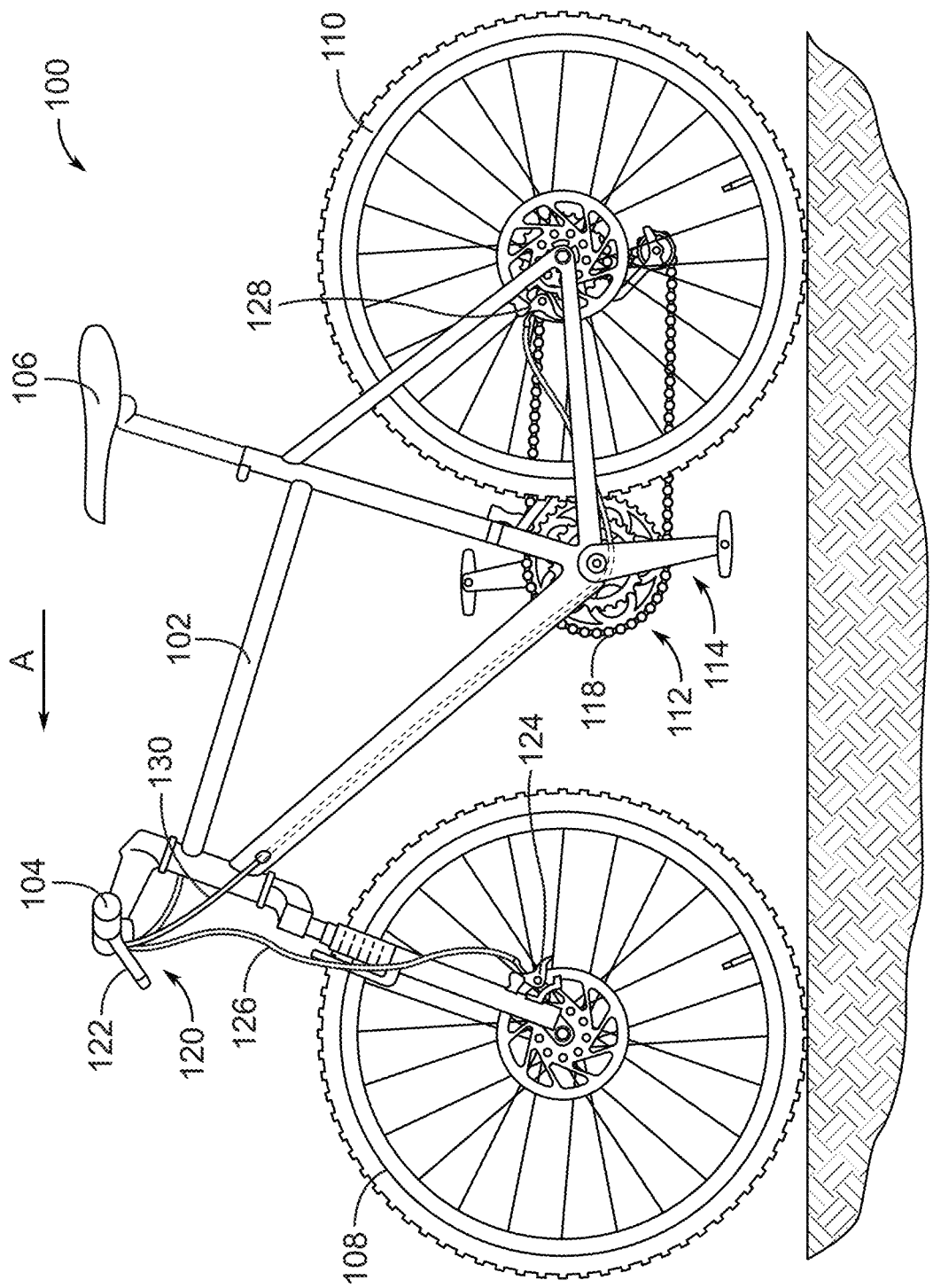
FIG. 1 is a side elevational view of a bicycle, which may be used to employ a hydraulic braking control device having staggered timing ports.

FIG. 1 illustrates an example bicycle 100, which may be used to implement staggered timing ports and the braking systems disclosed herein. In the illustrated embodiment, the bicycle 100 includes a frame 102, handlebars 104, and a seat 106. The bicycle 100 also includes a first or front wheel 108 and a second or rear wheel 110. The bicycle 100 includes a drive train 112. The drive train 112 of FIG. 1 includes a crank assembly 114 operatively coupled to a rear cassette (not shown) via a chain 118. While the illustrated bicycle 100 is a mountain bicycle, the embodiments disclosed herein may be implemented with other types of bicycles such as, for example, road bicycles. The front and/or forward orientation of the bicycle 100 is indicated by the direction of arrow "A". As such, a forward direction of movement for the bicycle is indicated by the direction of arrow A.

The bicycle 100 of FIG. 1 includes a hydraulic brake system 120. In the illustrated embodiment, the hydraulic brake system 120 includes a first brake lever assembly 122 and/or a second brake lever assembly (not shown). The first brake lever assembly 122 and/or the second brake lever assembly are disposed on the handlebars 104. The first brake lever assembly 122 may include a hydraulic control device for the bicycle 100. As such, the first brake lever assembly 122 is hydraulically coupled to a brake force application device, such as a first brake caliper 124, via a first brake line 126. In the illustrated embodiment, the first brake caliper 124 is operatively coupled to the front wheel 108. The second brake lever assembly may be operatively coupled to a different brake force application device, such as a second brake caliper 128, via a second brake line 130. The second brake caliper 128 is operatively coupled to the rear wheel 110. In other embodiments, the hydraulic brake system 120 includes one or more additional and/or alternative components and/or is configured in other ways. For example, the hydraulic brake system 120 may include alternative and/or additional brake force application devices, such as rim brake calipers, which may be in hydraulic communication with hydraulic braking system control devices.

A bicycle hydraulic brake control device 201 is shown in FIGS. 2-9 and generally includes a housing 202, and a lever assembly 205 including a lever 206 pivotably attached to the housing 202. In an embodiment, the lever assembly 205 may also include other components, such as a linkage 220 and/or a lever adjusting mechanism 214. The control device 201 may also include a reservoir cover 208 which covers a reservoir which will be described in greater detail below. Also visible is a piston adjustment knob 210 and a lever adjustment mechanism 214, which are also described in greater detail below. The housing 202 includes a master cylinder that is hydraulically connected to a slave cylinder which operates a brake force application device, such as a hydraulic caliper (not shown), by a hydraulic line attached to a hydraulic output 212. A clamp device 204 or any suitable fastening means may be part of or attached to the housing 202 for attaching the housing to a handlebar of a bicycle (not shown), for example.

Figure 3:
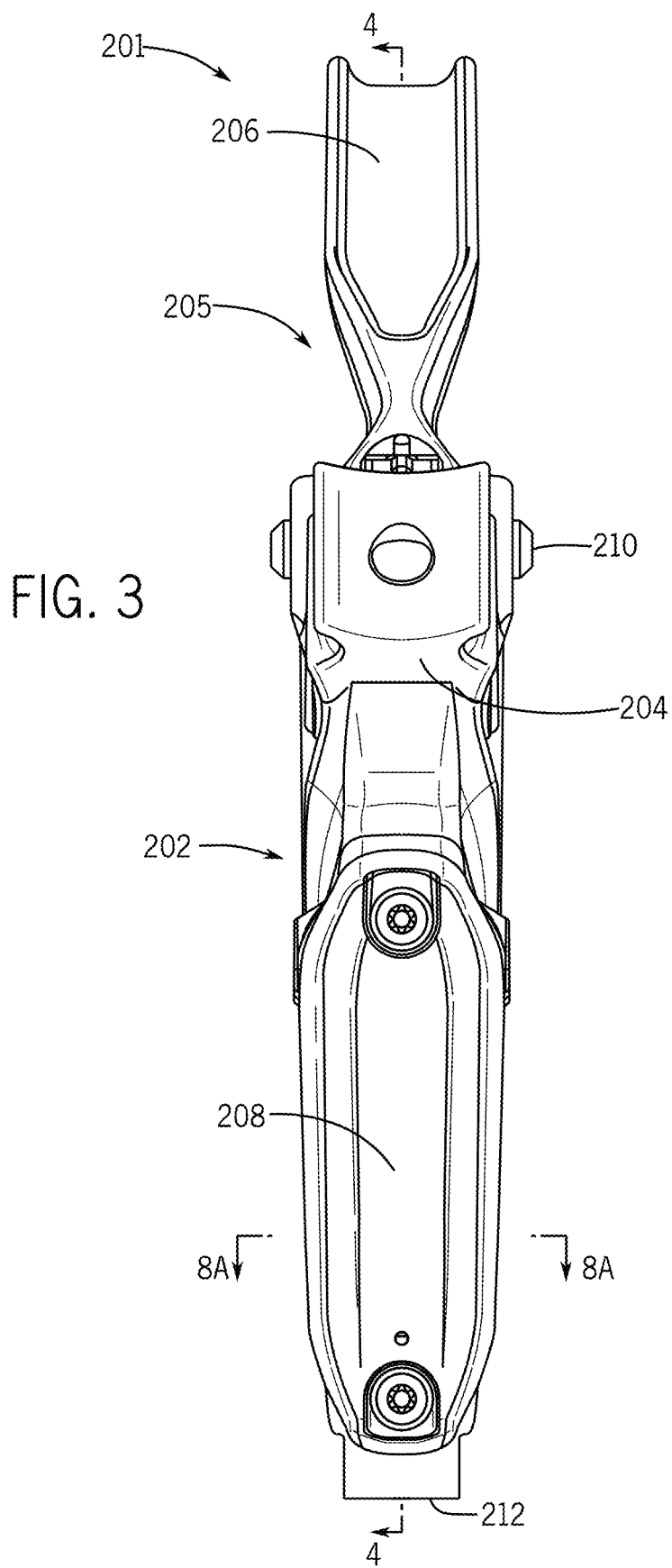
FIG. 3 is a top view of the hydraulic braking control device of FIG. 2.
Figure 4:
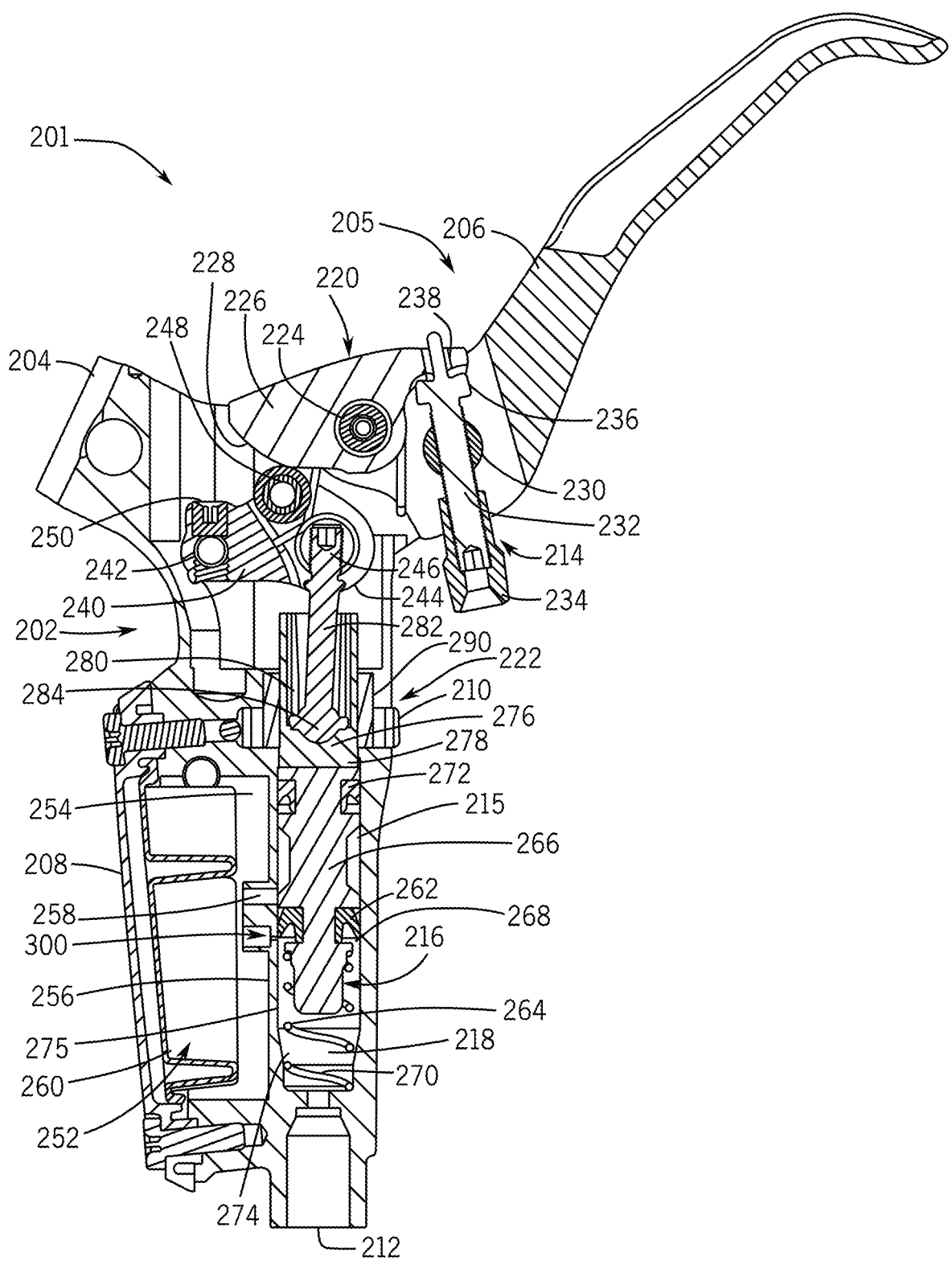
FIG. 4 is a cross-sectional view of the hydraulic braking control device of FIGS. 2 and 3.

FIG. 4 is a cross-sectional view of the bicycle hydraulic brake control device 201, as is indicated by section 4 of FIG. 3. The housing 202 includes a cylinder, which is a bore 215 in the housing 202 in this embodiment. A piston assembly 216 is reciprocally disposed within the bore 215. The bore 215 includes a fluid chamber 218. The linkage 220 operates between the lever 206 and the piston assembly 216 to produce a variable rate of travel of the piston assembly 216. A piston adjustment mechanism 222 operates between the linkage 220 and the piston assembly 216 to adjust the amount of dead band in the system without affecting the operation of the linkage 220.

The lever 206 may be in the form of a blade pivotably attached to the housing 202 of the hydraulic brake control device 201 by a first pin or pivot 224. A cam or cam-shaped link 226, which is part of one embodiment of the linkage 220, is either formed as part of the lever 206 or pivotally disposed on the first pin 224. The cam 226 has a cam-shaped surface 228 along one portion.

The lever adjusting mechanism 214 may be adjustably attached to the lever 206 on a second pin 230, with the second pin attached to the lever. The second pin 230 may be generally outboard from the first pin 224.

The lever adjusting mechanism 214 may include a threaded shaft 232 threadably engaged with the second pin 230. One end of the lever adjusting mechanism 214 includes a grasping part 234 that is accessible and manipulatable by a user. The other end of the lever adjusting mechanism 214 includes a flared end or stop 236. The stop 236 abuts the cam 226 at the end 238 generally opposite the cam surface 228. Twisting the grasping part 234 causes the shaft 232 to either be inserted farther or removed from its engagement with the second pin 230, and as a result the distance between the second pin 230 and the adjustment end of the cam 238 changes. In this manner, the orientation of the cam 226 on the lever 206 can be changed, and the position of the lever is altered relative to a handlebar (not shown) when mounted thereon, and/or the housing 202.

The linkage 220 also includes a follower 240. The follower 240 is pivotably disposed on the housing 202. The follower 240 may be disposed on a third pin or pivot 242 attached to the housing 202. The follower 240 includes a fourth pin 244, which is located opposite the third pin 242. The fourth pin 244 may include a threaded bore 246. The follower 240 may include a roller 248, which is rotatably disposed between the third pin 242 and the fourth pin 244. The roller 248 engages the cam surface 228 of the cam link. The interaction of the follower 240 and the cam 226 when the lever 206 is moved causes the piston assembly 216 to travel according to the profile of the cam surface 228. The position of the roller 248 on the cam surface 228 determines the part of the profile of the cam surface 228 actuating the piston assembly 216 in response to movement of the lever 206. The follower 240 may be secured to the third pin 242 with a locknut 250.

The housing 202 may be any suitable shape that can define a hollow interior including a bore 215, and accommodates the mounting of and operation of the linkage 220. The housing 202 may be made of any suitable material, for example, metal, plastic, fiber-resin based composite materials, or combinations thereof. The bore 215 includes a fluid chamber 218. The fluid chamber 218 includes hydraulic fluid (e.g. brake fluid) as is known.

The illustrated bicycle hydraulic brake control device 201 is an "open" type of fluid system. The device includes a reservoir 252. The reservoir 252 includes a reservoir chamber 254 defined in a portion of the housing 202 in communication with the fluid chamber 218. Extending through the bore wall 256 between the reservoir chamber 254 are timing ports 300 and a compensating port 258. A diaphragm or seal 260 made of an elastomeric material such as silicon rubber is made to cover the reservoir chamber 254.

Pivoting the lever 206 from a rest position causes the piston assembly 216 to drive the piston into the bore 215. As the piston moves in the bore, a leading seal 262, which may be a cup or umbrella seal, covers the timing ports 300 which pressurizes the fluid within the output 212 at the end of the fluid chamber 218 and which in turn actuates a slave cylinder within a hydraulically coupled brake force application device, such as a brake caliper (not shown). When the lever 206 is released, the piston assembly biasing element 264 biases the piston 266 toward the first end 268 of the fluid chamber 218, away from a second end 270 of the fluid chamber 218, to reassume the rest or home position for the piston 266. The distance between the leading edge of the cup seal 262 when the piston is in the home position and a fluid chamber sealing timing port 300 is a "dead-band" of the stroke of the piston and/or leading seal. Specifically, during movement of the piston 266 and the leading seal 262 through the dead band, for example the part of lever actuation where the cup seal 262 is between the timing ports 300 and the first end of the fluid chamber 268, hydraulic fluid in the reservoir 252 between the seal 262 and the timing ports 300 returns to the reservoir 252. The diaphragm 260 of the reservoir 252 may expand to allow for the increase in fluid passing from the fluid chamber 218 to the reservoir 252. During this part of lever actuation, and associated piston stroke, the second end 270 of the fluid chamber 218 is not pressurized to provide braking forces at the brake force application device. It is highly desirable to be able to adjust the length of the dead-band in accordance with user preferences.

Multiple timing ports 300 are disposed along the length of the cylinder. The timing ports 300 may be any shape, size, or orientation. In an embodiment, the timing ports are oval and/or generally circular and have a diameter of 0.4 millimeters or less. For example, a sealing port of a group of timing ports 300 may be sized at 0.4 millimeters or less. In another embodiment, the timing ports 300 may be different sizes with at least one timing port having a diameter of 0.4 millimeters or less. In yet another embodiment all or a majority of the timing ports may have a diameter of 0.4 millimeters or less.

To accommodate the volume of fluid within the fluid chamber 218 that will be displaced into the reservoir 252 during movement of the piston through the dead band, multiple timing ports are used. At least two of these timing ports are at different positions along the bore 215 relative to the second end 270 and/or the first end 268 of the fluid chamber 218. The timing port, or ports, located closest to the second end 270 of the fluid chamber 218 will define the end of the dead band of the stroke. When the last of the timing ports within the fluid chamber 218 is sealingly engaged, a fluid pressure chamber is formed, as is described further below.

The piston assembly 216 is disposed in the bore or cylinder 215 to partially define the fluid chamber 218. The piston may be provided with one or more seals 262, 272. A leading seal 262 sealingly engages the wall 275 of the bore 215 to create and/or defines a fluid pressure chamber 274, and reciprocates throughout a stroke of the seal, or piston, to generate and/or relieve pressure at the output 212. The seals 262, 272 may be any type of seals. For example, O-rings or umbrella seals may be used. Where two seals 262, 272 are used, the rearmost 272 of the seals may be considered to define with the piston 266 and the wall 275 of the bore 215 the fluid chamber 218 (i.e. the volume of the bore that includes fluid).

The piston assembly 216 is constructed and positioned within the bore 215 to reciprocate along a piston or cylinder axis 286. The piston assembly 216 is preferably biased in a rest or home position by the piston assembly biasing element 264, which may be a spring, such as a coil spring as shown. The action of the biasing element 264 may also return the lever 206 to a rest or home position.

The piston assembly 216 may include a separate cap member 276. The cap member 276 may be a barrel shaped piece that fits within the bore 215 and abuts the proximal end of the piston 266. The cap member 276 may include a flange 278 or the like at or near the end abutting the piston. The cap member 276 may also include a non-round interior 280 that may be in the form of a key hole or similar shape.

A pushrod 282 is connected to the follower 240 at one end and contacts the piston assembly 216 at the other end. The pushrod 282 includes a head 284. The head 284 includes a ball surface received in a corresponding interior 280 of the cap member 276 of the piston assembly 216 in a keyed relationship. The pushrod 282 may be threadably engaged with the threaded bore 246 of the fourth pin 244 at an end opposite the head 284.

The piston assembly 216 may be a single-piece as shown or formed as multiple pieces. In one embodiment, the piston 266 may be a separate part of the assembly 216. Alternatively, the piston 266 may be formed as a single-piece construction with the cap member 276.

The control device 201 may include a piston adjustment mechanism 222 that is disposed in the housing 202 to adjust the dead band portion of the piston stroke. The piston adjustment mechanism 222 includes a sleeve member 290 that is disposed about and keyed to the cap member 276. The sleeve member 290 is also threadably engaged in the bore 215 of the housing 202. The sleeve member 290 may be turned by a manually movable member or knob 210 that is keyed to the sleeve member 290. The movable member 210, when rotated, causes axial movement of the sleeve member 290 and movement of the sleeve member causes axial movement of the cap member 276 through interaction of the sleeve member with the flange 278 of the cap member.

At the same time that the sleeve member 290 is moved axially, the pushrod 282 is translated axially the same amount and in the same direction as the cap member 276 by the threaded engagement of the pushrod in the fourth pin 244. In this way, no slack or lash is created by adjustment of the dead band with the piston adjustment mechanism 222. Also, the positions of the elements of the linkage 220 are unaffected. As such, the lever with the lever adjustment mechanism 214 independent of the adjustment of the dead band adjustment of the piston adjustment mechanism 222. The piston adjustment mechanism 222 operates in correlation to one or more sealing timing ports of a group of timing ports 300 to define the length of the dead band piston stroke.

Figure 5:
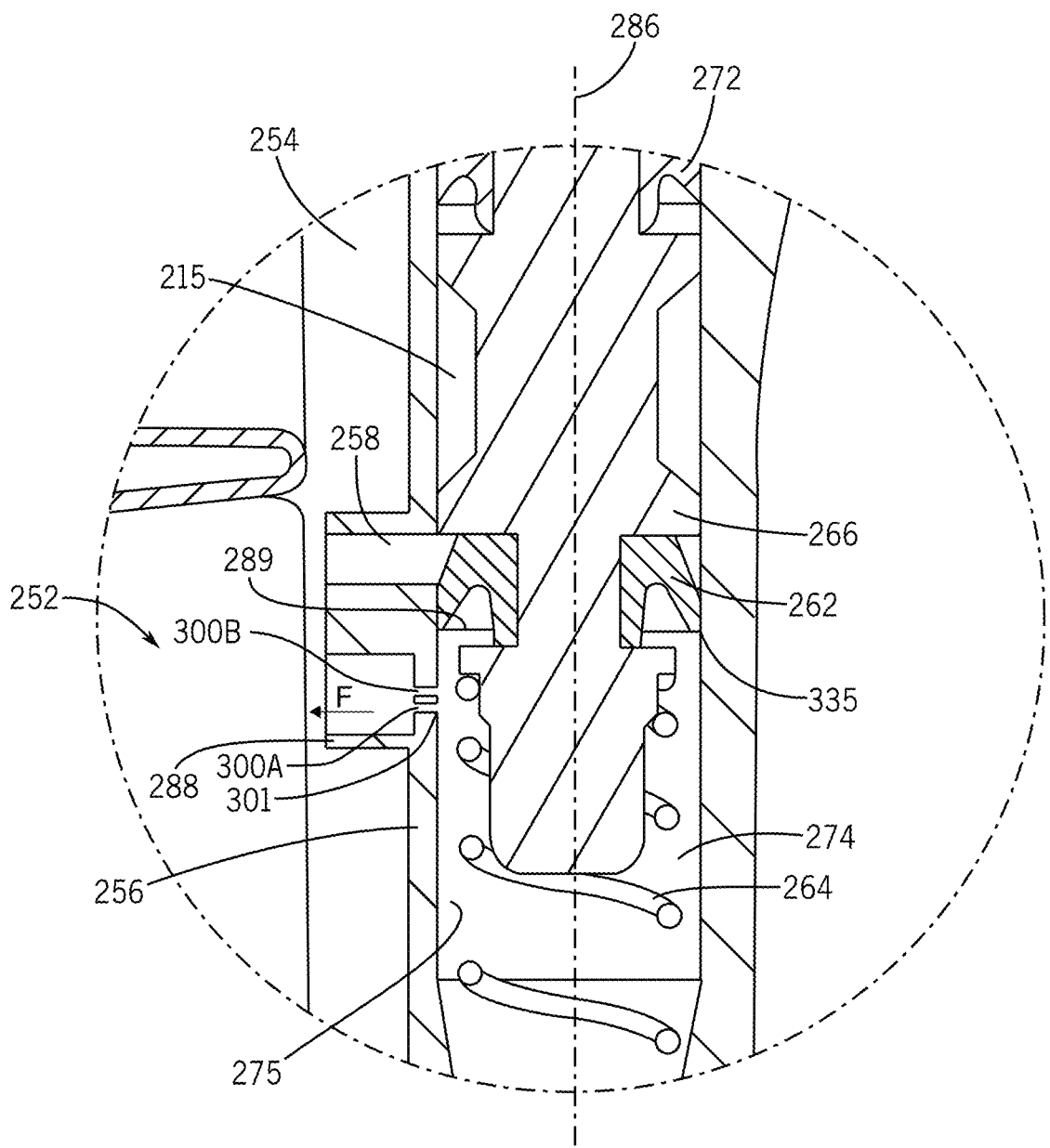
FIGS. 5-7 are enlarged cross-sectional views of a portion of the hydraulic braking control device as shown in FIG. 4 in various orientations.
Figure 6:
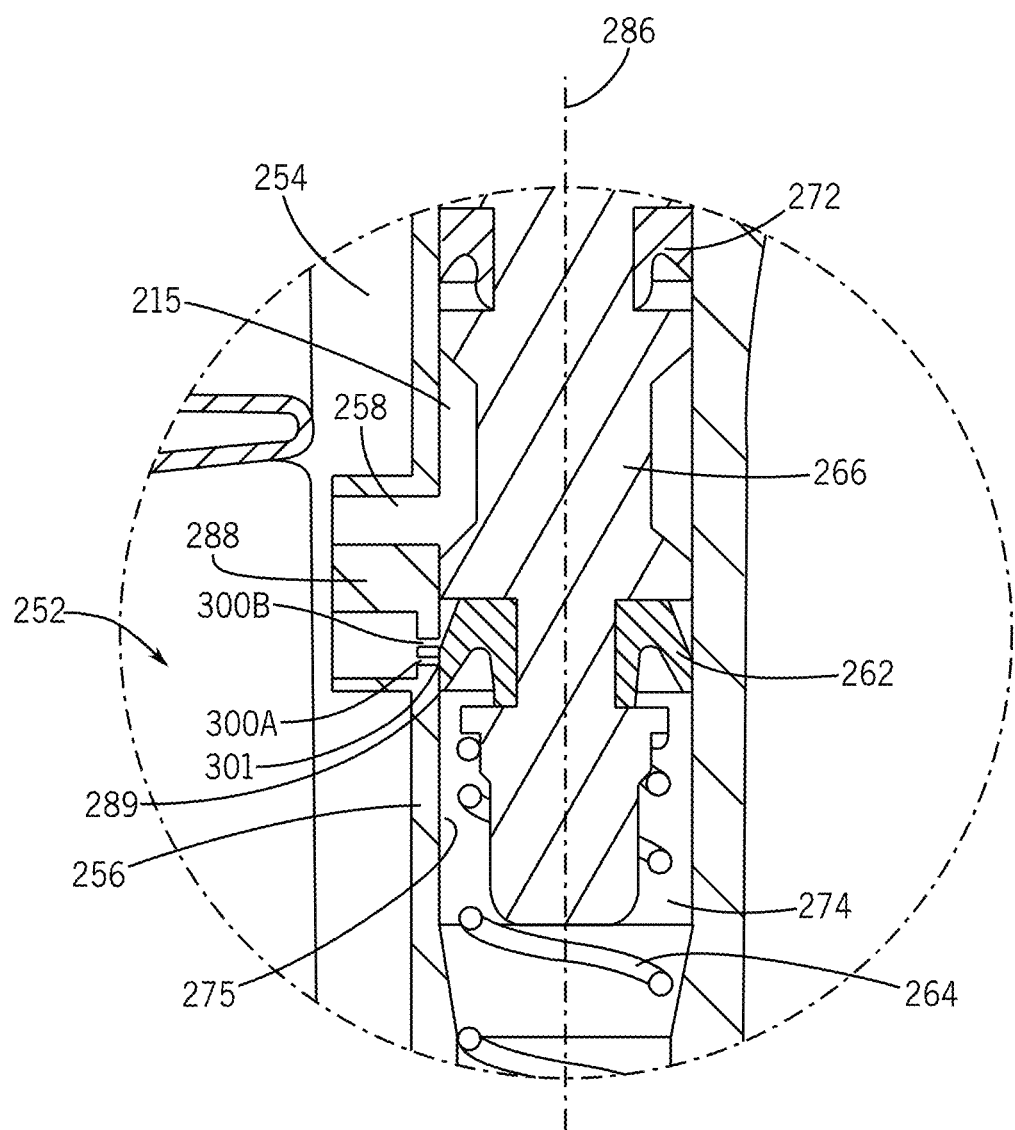
Figure 7:
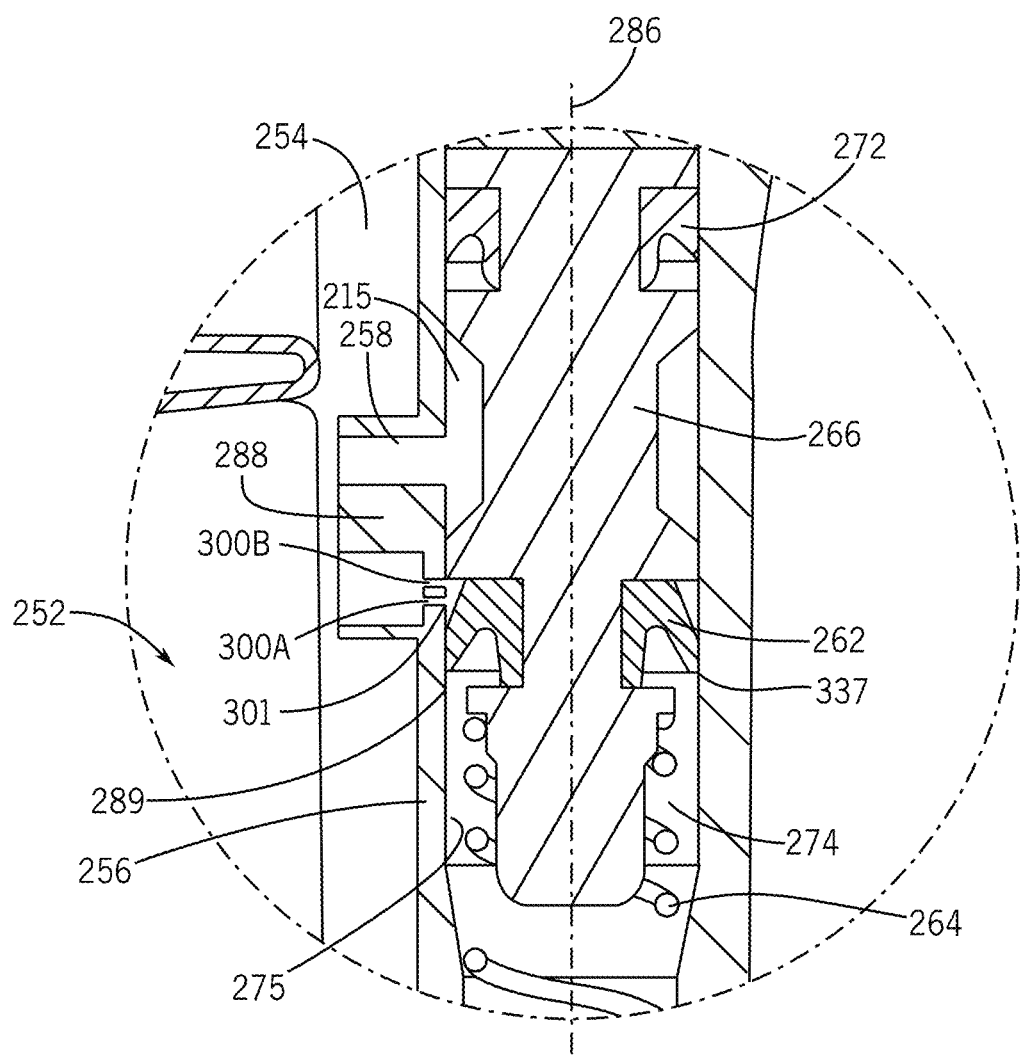

FIGS. 5-7 show the piston 266 at various positions of the piston stroke. FIG. 5 shows the piston 266 in the home, initial, or beginning position 335 of the piston stroke. As used herein, various positions of a piston stroke may refer to specific locations of a part of the piston, such as a leading or sealing portion 289 of the seal 262, along the cylinder axis 286. In this initial position 335 the leading portion 289 of the leading seal 262 has not passed or otherwise sealed or sealingly engaged the ports 300A, 300B, and fluid may flow from the fluid chamber 215 to the reservoir chamber 254 of the reservoir 252, as is indicated by the arrow F. Also, a deadband of the hydraulic brake control device 201 may be defined by the distance of the leading portion 289 of the leading seal 262 when the piston 266 is in the initial position 335 to a sealing edge 301 of one or more sealing ports 300A. As described herein, in an embodiment this deadband distance is adjustable.

FIG. 6 shows the piston 266 with the leading seal 262 as it has sealingly engaged the last timing port 300A. The port 300A is sealingly engaged when the leading portion 289 of the leading seal 262 has passed or otherwise sealed a sealing or leading edge 289 of the one or more sealing ports 300A, thus isolating a portion of the fluid chamber 218 from the reservoir 252 creating the fluid pressure chamber 274. FIG. 7 shows the piston 266 in a final or ending position 337 of the stroke, wherein pressure has been generated in the fluid pressure chamber 274 due to a movement of the piston to the final stroke position from the sealing edge 301 of the one or more sealing ports 300A.

In an embodiment, the linkage 220 is operated by movement of the lever 206, which in turn causes the piston assembly 216 to move along a cylinder axis of the bore 215 and sealingly engage a series of timing ports 300B, 300A. Once a last timing port 300A along the cylinder axis 286 is sealingly engaged, further movement of the piston in the pressurizing direction generates fluid pressure within the fluid pressure chamber 274.

As can be seen from the sequence illustrated by FIGS. 5-7, the compensation port 258, which provides fluid communication between the reservoir 252 and the fluid chamber 215, is not within the stroke of the piston 266 as defined by the leading seal 262.

Figure 2:
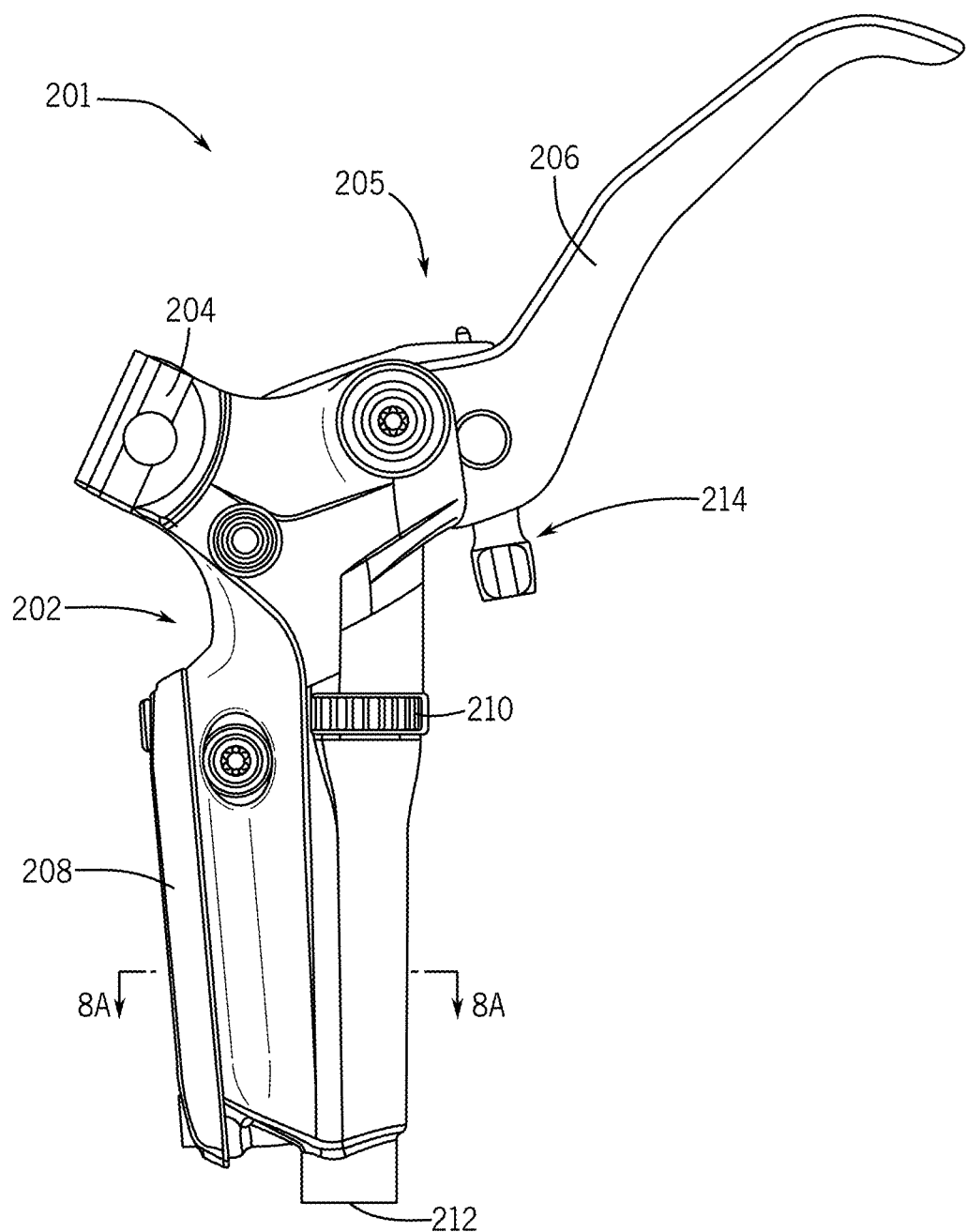
FIG. 2 is side view of a hydraulic braking control device, which may be used to implement the bicycle of FIG. 1.

FIGS. 8A and 8B show a cross section of the hydraulic brake control device 201 at section 8A illustrated in FIG. 2, with the piston assembly removed for clarity. FIG. 8B displays an enlarged view of an area 8B of FIG. 8A. In this embodiment, two timing ports 300C, 300D are bisected on the cut plane A-A, with an additional timing port 300A shown with hidden lines to illustrate that this timing port 300A is at a different location along the stroke of the piston, and as such will be sealing engaged by the piston at a different time than the other timing ports 300C, 300D. As is described above, the sealing engagement of port 300A will indicate the generation of the fluid pressure chamber and/or the end of the piston stroke dead zone. Also viewable in the cross section displayed in FIGS. 8A and 8B is a protective structure 288 that surrounds the timing ports and the compensation port on the openings of the respective ports on the reservoir side of the ports, and protrudes into the reservoir 288.

In the displayed embodiment, the timing ports 300A, 300C, 300D are formed directly in the housing 202 with straight and/or vertical holes between the reservoir and the bore or cylinder 215 of the device. Other shapes and/or configurations may also be used to provide the fluid communication between the bore 215 and the reservoir. Also, as shown, the ports are provided with circular cross sections. Other cross section shapes, or combinations thereof, may also be used. Also, the timing ports are shown with a same diameter and cross-sectional area, but in an embodiment, the diameters and/or cross-sectional areas may vary between the timing ports. For example, a sealing timing port 300A may have a smaller cross-sectional area than other timing ports 300C, 300D. Alternatively, the sealing timing port 300A may have a larger cross-sectional area than other timing ports 300C, 300D. Also, the cross section of the timing ports 300 may be any shape. For example, circular, rectangular, oval, or other shapes may be used.

Also, in an embodiment, the timing ports 300A, 300C, 300D may be disposed and/or arranged within an area or sector C of a cylinder, or bore 215 as shown in FIGS. 8A and 8B. Timing ports being oriented with a straight channel or path from the reservoir 252 and the bore 215 will intersect with the cylinder wall 275 at various positions with respect to a cylinder central axis 287, which may be the cylinder axis 286 as described herein. As the ports are positioned farther away from the cylinder central axis 287, the opening in the cylinder wall created by the intersection of the timing ports and the bore will increase in size based on the angle of intersection with the curved cylinder wall 275. As such, a timing port 300A may have a smaller cross-sectional area for the interface with the cylinder wall 275 than other timing ports 300C, 300D. The placement of the timing ports 300A, 300C, 300D may be limited to a cylinder wall 275 area or sector C to minimize the size of the opening created in the cylinder wall 275.

Figure 9:
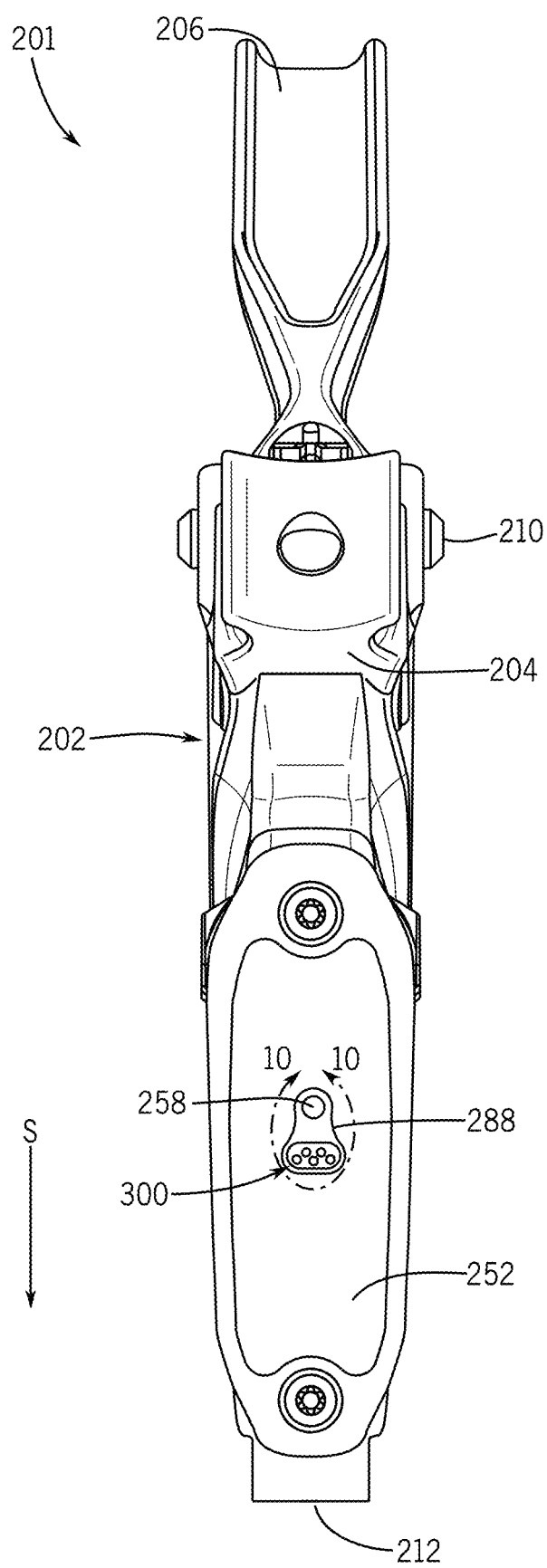
FIG. 9 is another top view of the hydraulic braking control device of FIG. 2.

FIG. 9 shows the top view of the device 201 of FIG. 3 with the reservoir cover 208 and diaphragm removed to show the interior of the reservoir 252 that contains the protective structure 288 as well as reservoir openings of the timing ports 300 and the compensation port 258. As shown, a pressure generating piston stroke acts in the direction S indicated by the arrow.

FIGS. 10A-10I illustrate different configurations of timing ports for various embodiments. The configurations are displayed as viewed from a top view of a portion 10 of the reservoir as shown in FIG. 9. The embodiments also include a distinct and/or additional port, such as a compensation port 258, that also provides fluid communication between the cylinder interior, or bore interior, and the reservoir, but is positioned outside the stroke of the piston. The compensation port 258 may have a different cross-sectional area than the timing ports. For example, the compensation port 258 cross-sectional area may be larger (e.g. larger diameter) than individual timing port cross-sectional areas. In an embodiment, the timing ports have a diameter of 0.4 millimeters or smaller. In this embodiment the compensation part having a diameter greater than 0.4 millimeters may be included.

Also, the position of the ports 300 along the cylinder axis 286 may be defined using any portion of the port. For example, a center of ports 305 may be used to define positions of the ports, as is shown in FIG. 10D. In other embodiments an edge of ports 307 may be used to define positions of the ports, as is shown in FIG. 10G.

In the embodiments illustrated in FIGS. 10A-10F the timing port channels or holes are formed straight and intersect with a device bore or cylinder below, as is shown in FIGS. 8A and 8B. As such, the illustrated configurations are representative of an orientation of the ports along the cylinder axis 286 in the bore or cylinder. FIGS. 10A-10G also show relative positions R1, R2, R3 of the timing ports along the cylinder axis 286, as measured from a resting, home, initial, or first position of a piston stroke P1. As is described above, an embodiment may involve the ability to adjust the initial position of the piston in the piston stroke, and as such P1 may vary.

FIGS. 10A-10E illustrate embodiments having a single sealing timing port 300A at a sealing position R1 along the cylinder axis. The singular sealing port 300A is disposed closer to the ending position of the stroke than the remainder of the plurality of ports. This singular sealing timing port 300A establishes the end of the piston stroke dead zone and/or the creation of the fluid pressure chamber within the bore. The other timing ports 300B, 300C, 300D, 300E, 300F are positioned at different locations R2, R3 along the cylinder axis 286.

Figure 10A:
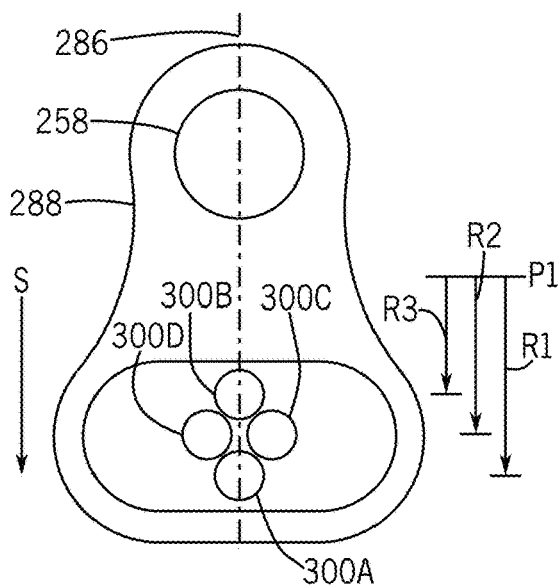
FIGS. 10A-10I illustrate various embodiments that involve configurations of staggered timing ports.
Figure 10B:
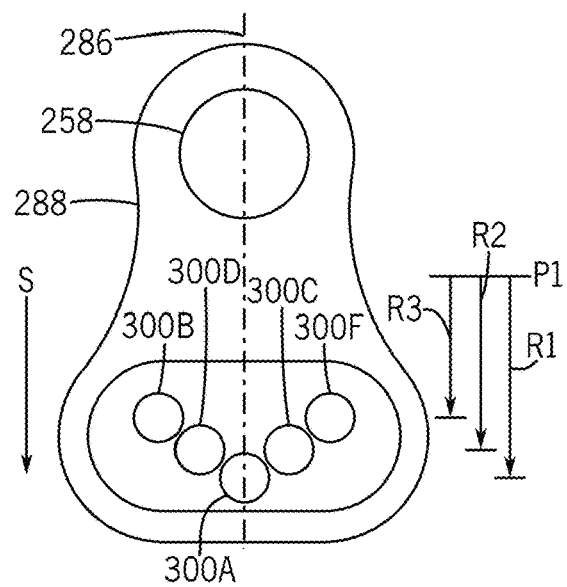
Figure 10C:
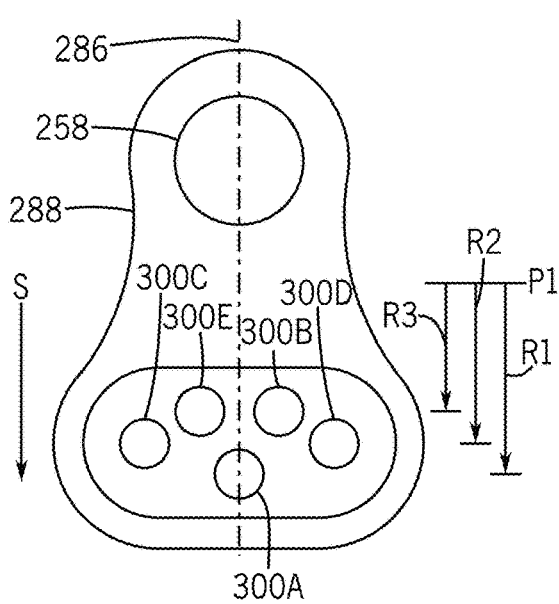
Figure 10D:
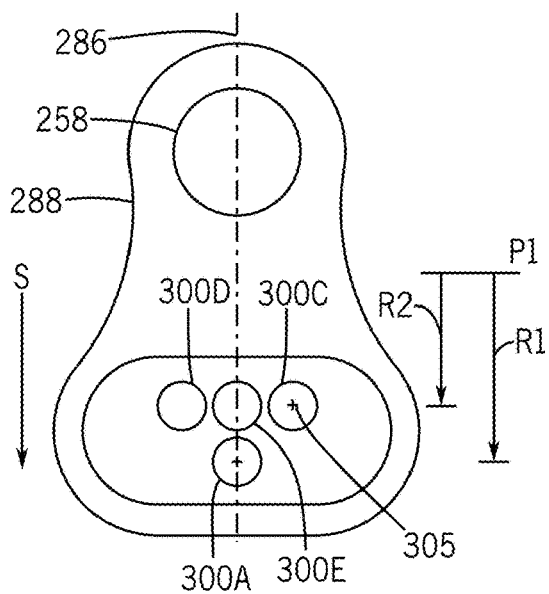
Figure 10E:
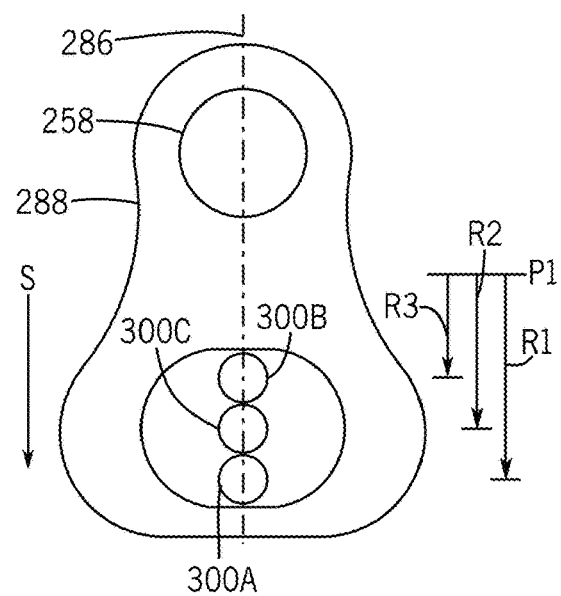

In an embodiment, such as the embodiment illustrated in FIG. 10B, a plurality of ports are configured into an array of ports defined by a first set of ports 300E, 300C, 300D located at a first position R2 along the cylinder axis 286 and at least one port 300A is located at a second position R2 along the cylinder axis 286. Some of the embodiments, such as the embodiment illustrated in FIG. 10A, include at least one port 300B at a third position R3 along the master cylinder axis 286.

Figure 10F:
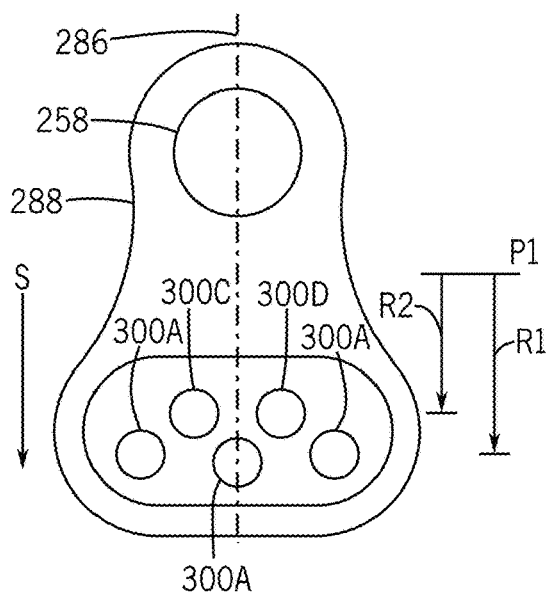
Figure 10G:
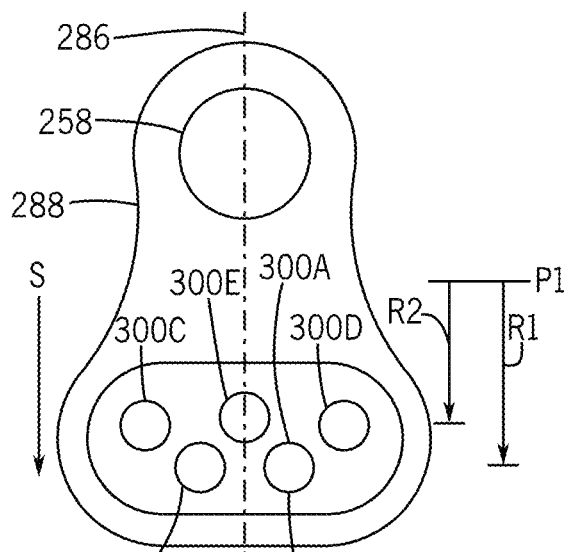

FIGS. 10F and 10G illustrate embodiments that include a set of timing ports 300A disposed at a same distance R1 along the cylinder axis that will collectively act as sealing ports, as well as a second set of timing ports 300C, 300D, and/or 300E disposed at a second distance R2 along the cylinder axis 286.

Figure 10H:
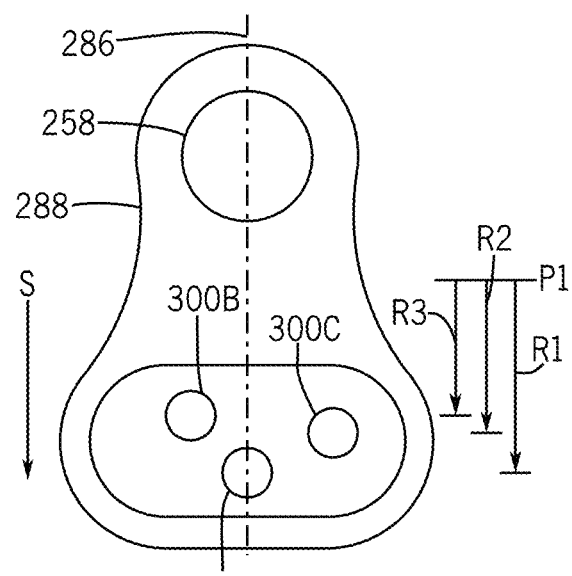
Figure 10I:
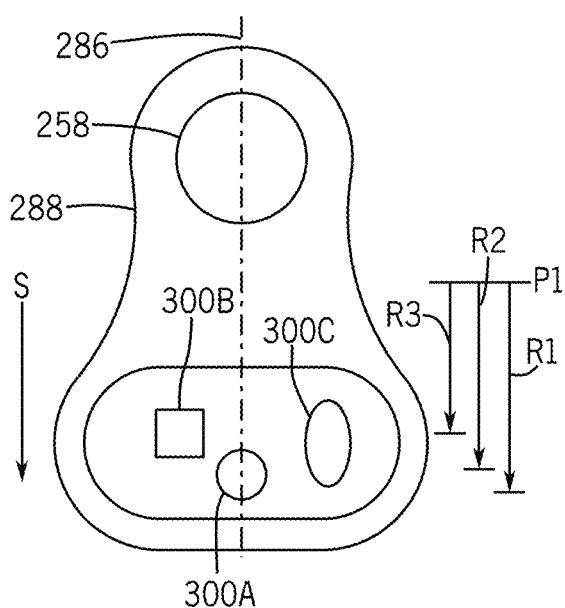

FIG. 10H illustrates an embodiment that includes a singular sealing timing port 300A, but includes circumferential asymmetric positioning of the other timing ports 300B, 300C. For example, one of the other ports is 300C is spaced apart from the sealing port 300A differently than another of the ports 300B. Also, the other ports 300B, 300 C are spaced along the cylinder axis at different distances from the sealing timing port 300A, and include no symmetrical timing port positioned on the opposite circumferential side of the sealing timing port 300A. Further, as can be seen illustrated in FIG.

10I, the ports may be any shape, such as rectangular, oval, and/or circular. Also, the sealing port 300A may be any shape.

In an embodiment, a hydraulic control device for a bicycle hydraulic brake includes a reservoir for hydraulic fluid and a cylinder having an interior defined by a cylinder wall, the cylinder extended along a cylinder axis. The hydraulic control device also includes a piston positioned in the cylinder interior having a seal operatively associated therewith, the piston and seal being moveable along the cylinder axis between the first and second cylinder ends, wherein the seal defines a fluid pressure chamber and has a starting position and ending position within the cylinder defining a stroke of the piston. The hydraulic control device also includes a plurality of ports providing fluid communication between the cylinder interior and the reservoir, the plurality of ports disposed within the stroke of the piston at different positions along the cylinder axis, wherein the seal sealingly engages the plurality of ports within the stroke. The plurality of ports may have a circular or non-circular inner bore. The plurality of ports may include a singular sealing port disposed closer to the ending position of the stroke than the remainder of the plurality of ports. The plurality of ports may be configured into an array of ports defined by at least one port located at a first position along the cylinder axis and at least one port located at a second position along the cylinder axis. The plurality of ports may further include at least one port at a third position along the cylinder axis. The hydraulic control device may further involve at least one port, different from the plurality of ports, providing fluid communication between the cylinder interior and the reservoir, wherein the at least one port is positioned outside the stroke of the piston. The at least one port may have a larger diameter than a diameter of the ports of the plurality of ports. The hydraulic control device may also include a lever assembly coupled with the piston so as to move the piston when a lever of the lever assembly is engaged. The hydraulic control device may also include a hydraulic control housing, wherein the cylinder wall is integrated with the hydraulic control housing. Also, the reservoir may be integrated in the hydraulic control housing. Further, the hydraulic control device may also include a lever assembly attached to the hydraulic control housing, the lever assembly coupled with the piston so as to move the piston when a lever of the lever assembly is engaged. The hydraulic control device may further include a piston adjustment mechanism configured to adjust a position of the piston along the cylinder axis relative to at least one sealing port of the plurality of ports to adjust a dead band of the device. The hydraulic control device of claim may also include a lever adjustment mechanism for a lever assembly, the lever assembly coupled with the piston so as to move the piston when a lever of the lever assembly is engaged, wherein the lever adjustment mechanism operates independently from the piston adjustment mechanism. Also, at least two ports of the plurality of ports have different cross-sectional areas. Further, at least one port of the plurality of ports may have a diameter of 0.4 millimeters or less.

In an embodiment, a hydraulic braking system for a bicycle includes a hydraulic control device configured for mounting to a bicycle handlebar. The hydraulic control device includes a reservoir for hydraulic fluid, and a cylinder having an interior defined by a cylinder wall, the cylinder extended along a cylinder axis. The hydraulic control device also includes a piston positioned in the cylinder interior having a seal operatively associated therewith, the piston and seal being moveable along the cylinder axis between the first and second cylinder ends, the seal having a starting position and ending position within the cylinder defining a stroke of the piston, and a plurality of ports providing fluid communication between the cylinder interior and the reservoir, the plurality of ports disposed within the stroke of the piston at different distances from the first cylinder end along the cylinder axis. The hydraulic braking system also includes a brake force application device in fluid communication with the hydraulic control device and configured to provide a stopping force to a wheel of the bicycle in response to movement of the piston along the stroke. The cylinder and the plurality of ports may be formed as an integrated hydraulic control housing of the hydraulic control device. The hydraulic control device may further include a lever assembly coupled with the piston so as to move the piston when a lever of the lever assembly is engaged. The stopping force may be generated in response to an isolation of fluid communication between the brake force application device and the reservoir when the piston seal sealingly engages a sealing port of the plurality of ports located closest to the ending position of the stroke. Further, the distance between the first position of the seal and the location of an edge of the sealing port defines a dead band of the hydraulic braking system, and wherein the first position may be adjustable to change the dead band. The hydraulic control device May also include at least one port, different from the plurality of ports, providing fluid communication between the cylinder interior and the reservoir. Also, the at least one port different from the plurality of ports may not be located within the stroke. Further, the brake force application device may be a hydraulic brake caliper. The hydraulic caliper may be configured to apply a braking force to a braking disc attached to the wheel or a rim of the wheel. Also, at least one port of the plurality of ports may have a diameter of 0.4 millimeters or less.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A hydraulic control device for a bicycle hydraulic brake, comprising:
   a reservoir for hydraulic fluid;
   a cylinder having an interior defined by a cylinder wall, the cylinder extended along a cylinder axis between a first cylinder end and a second cylinder end;
   a piston positioned in the cylinder interior having a seal operatively associated therewith, the piston and seal being moveable along the cylinder axis between the first and second cylinder ends, wherein a leading portion of the seal defines a fluid pressure chamber and has a rest position and ending position within the cylinder defining a stroke of the piston;
   a plurality of ports providing fluid communication between the cylinder interior and the reservoir, the plurality of ports disposed within the stroke of the piston at different positions along the cylinder axis, wherein the seal sealingly engages the plurality of ports within the stroke; and
   at least one port, different from the plurality of ports, providing fluid communication between the cylinder interior and the reservoir, wherein the at least one port is positioned outside the stroke of the piston.

2. The hydraulic control device of claim 1, wherein the ports of the plurality of ports have a circular or non-circular inner bore.

3. The hydraulic control device of claim 1, wherein the plurality of ports comprise a singular sealing port disposed closer to the ending position of the stroke than the remainder of the plurality of ports.

4. The hydraulic control device of claim 1, wherein the plurality of ports are configured into an array of ports defined by at least one port located at a first position along the cylinder axis and at least one port located at a second position along the cylinder axis.

5. The hydraulic control device of claim 4, wherein the plurality of ports further comprise at least one port at a third position along the cylinder axis.

6. The hydraulic control device of claim 1, wherein the at least one port has a larger diameter than a diameter of the ports of the plurality of ports.

7. The hydraulic control device of claim 1, further comprising a lever assembly coupled with the piston so as to move the piston when a lever of the lever assembly is engaged.

8. The hydraulic control device of claim 1, further comprising a hydraulic control housing, wherein the cylinder wall is integrated with the hydraulic control housing.

9. The hydraulic control device of claim 8, wherein the reservoir is integrated in the hydraulic control housing.

10. The hydraulic control device of claim 9, further comprising a lever assembly attached to the hydraulic control housing, the lever assembly coupled with the piston so as to move the piston when a lever of the lever assembly is engaged.

11. The hydraulic control device of claim 1, wherein at least two ports of the plurality of ports have different cross-sectional areas.

12. The hydraulic control device of claim 1, wherein at least one port of the plurality of ports has a diameter of 0.4 millimeters or less.

13. A hydraulic braking system for a bicycle, comprising:
   a hydraulic control device configured for mounting to a bicycle handlebar, the hydraulic control device comprising:
      a reservoir for hydraulic fluid,
      a cylinder having an interior defined by a cylinder wall, the cylinder extended along a cylinder axis between a first cylinder end and a second cylinder end,
      a piston positioned in the cylinder interior having a seal operatively associated therewith, the piston and seal being moveable along the cylinder axis between the first and second cylinder ends, a sealing portion of the seal having a home position and ending position within the cylinder defining a stroke of the piston, and
      a plurality of ports providing fluid communication between the cylinder interior and the reservoir, the plurality of ports disposed within the stroke of the piston at different distances from the first cylinder end along the cylinder axis;

at least one port not located within the stroke, different from the plurality of ports, providing fluid communication between the cylinder interior and the reservoir; and a means for applying a brake force in fluid communication with the hydraulic control device and configured to provide a stopping force to a wheel of the bicycle in response to movement of the piston along the stroke.

14. The hydraulic braking system of claim 13, wherein the reservoir, the cylinder and the plurality of ports are formed as an integrated hydraulic control housing of the hydraulic control device.

15. The hydraulic braking system of claim 14, wherein the hydraulic control device further comprises a lever assembly coupled with the piston so as to move the piston when a lever of the lever assembly is engaged.

16. The hydraulic braking system of claim 13, wherein the stopping force is generated in response to an isolation of fluid communication between the brake force application device and the reservoir when the piston seal sealingly engages a sealing port of the plurality of ports located closest to the ending position of the stroke.

17. The hydraulic braking system of claim 16, wherein the distance between the first position of the seal and the location of an edge of the sealing port defines a dead band of the hydraulic braking system, and wherein the first position is adjustable to change the dead band.

18. The hydraulic braking system of claim 13, wherein the brake force application device is a hydraulic brake caliper.

19. The hydraulic braking system of claim 18, wherein the hydraulic caliper is configured to apply a braking force to a braking disc attached to the wheel or a rim of the wheel.

20. The hydraulic braking system of claim 13, wherein at least one port of the plurality of ports has a different cross sectional area than an other port of the plurality of ports disposed within the stroke of the piston at different distances from the first cylinder end along the cylinder axis, the at least one port being a sealing port having a diameter of 0.4 millimeters or less.

* * * * *